July 22, 1958   J. H. GETTIG   2,844,149
HYPODERMIC CANNULA AND METHOD FOR ATTACHING
AN ANNULAR SLEEVE THERETO
Filed July 23, 1957   2 Sheets-Sheet 1

INVENTOR
Joseph H. Gettig
BY Pierce, Scheffler & Parker
ATTORNEYS

July 22, 1958 J. H. GETTIG 2,844,149
HYPODERMIC CANNULA AND METHOD FOR ATTACHING
AN ANNULAR SLEEVE THERETO
Filed July 23, 1957 2 Sheets-Sheet 2
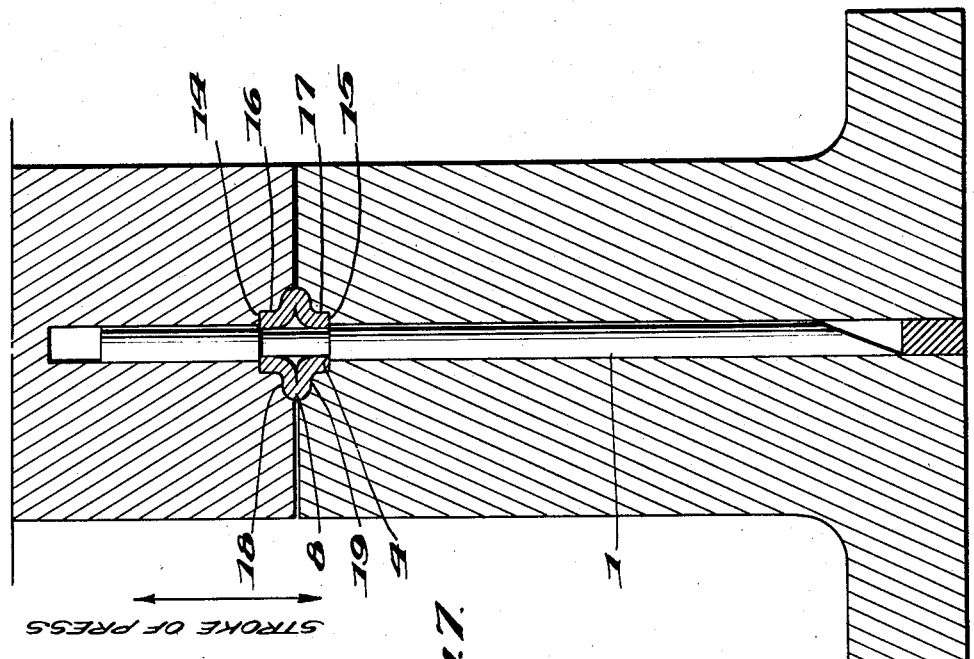
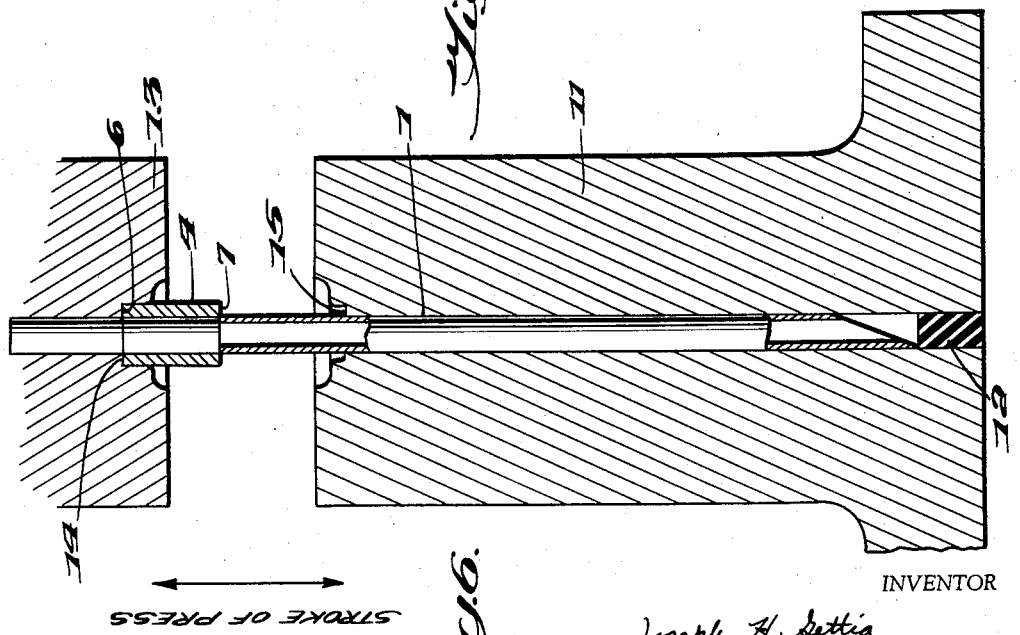
INVENTOR
Joseph H. Gettig
BY Pierce, Scheffler & Parker
ATTORNEYS

United States Patent Office 2,844,149
Patented July 22, 1958

2,844,149

HYPODERMIC CANNULA AND METHOD FOR ATTACHING AN ANNULAR SLEEVE THERETO

Joseph H. Gettig, Malvern, Pa., assignor to J. Bishop & Co. Platinum Works, Malvern, Pa., a corporation of Pennsylvania Application July 23, 1957, Serial No. 673,702

6 Claims. (Cl. 128—221)

This invention relates generally to a method for securing a tubular sleeve to cylindrical metal objects such as rods, tubes or wires, and more particularly to the method for forming a radial projection on a hypodermic cannula intermediate its ends and the resulting product produced thereby.

In the hypodermic syringe art, it is desirable to provide means on the smooth cylindrical surface of the cannula for firmly securing the cannula to the syringe head. In the prior art it has been disclosed to secure a metal head upon the cannula intermediate its ends by pressing (as in the U. S. patent to Brody, No. 1,569,453) or by welding (as in the U. S. patent to Poux, No. 2,453,590). These cannulas of the prior art are difficult to manufacture, relatively expensive, and often structurally weak.

It is desirable not only in the hypodermic cannula art but also in the manufacture of many analogous metal articles to securely attach a tubular sleeve to a cylindrical member intermediate its ends.

Accordingly, the primary object of my invention is to provide a novel method for securing a tubular sleeve to a cylindrical member intermediate its ends, the ends of said sleeve being axially compressed toward the center of the sleeve to form a radial, annular projection at the central portion thereof.

A more specific object of my invention is to provide a cannula for a hypodermic syringe upon which has been placed intermediate its ends a tubular sleeve the ends of which have been axially compressed to cause a radial, annular projection at the central portion of the tubular sleeve.

Another object of my invention is to provide a cannula upon which has been placed a tubular sleeve the ends of which have been axially compressed to cause a radial, annular projection at the central portion of the sleeve and a radial compression of the sleeve upon the outer surface of the cannula.

Other objects and advantages of my invention will become more apparent from a study of the following specification when considered in conjunction with the accompanying drawings in which:

Figs. 6 and 7 are sectional views of the die apparatus for securing the sleeve to the cannula.

Figure 1:
Fig. 1 is a sectional elevational view of the cannula.
Figure 2:
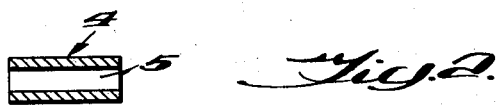
Fig. 2 is a sectional view of the tubular sleeve to be applied to the cannula.
Figure 3:
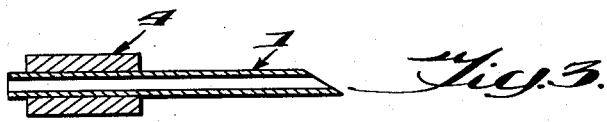
Fig. 3 is a sectional view of the sleeve positioned about the cannula.

As shown in Fig. 1, the hypodermic needle or cannula 1 has a hollow bore 2 extending therethrough and terminates at one end in a sharp injection point 3. The needle is preferably of a hard metal, such as stainless steel, platinum, metal alloys, or other materials commonly employed for hypodermic administration and adapted to withstand high sterilizing temperatures and repeated use. The tubular sleeve 4 of Fig. 2 is also formed from metal such as stainless steel, brass, nickel or other metal or alloy material suitable for being formed or pressed in a die. The sleeve 4 has a bore 5 extending therethrough of a diameter substantially equal to the outer diameter of the needle 1. In order to secure the sleeve 4 upon the needle 1, the sleeve is slipped on the needle intermediate its ends as shown in Fig. 3 and is pinched or formed by suitable die means (as will be explained in greater detail below with respect to Figs. 6 and 7) into the rigid assemblage of Fig. 4.

Figure 4:
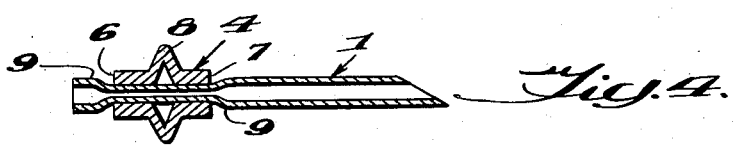
Fig. 4 is a sectional view of the sleeve and cannula assemblage when the sleeve has been pinched in the die.

As shown in Fig. 4, the ends 6, 7 of the sleeve 4 have been forced together axially so that central portion of the tubular sleeve is formed into a radial bulge or projection 8. During the forming of the radial projection 8, the sleeve is compressed radially to a small degree about the outer surface of the sleeve with a resulting compression of the outer surface of the needle so that the curved lips 9 of the outer surface of the needle 1, as exaggeratedly shown in Fig. 4, serve to lock the sleeve against longitudinal displacement upon the needle 1. As will be seen from the figure, the bore of the needle has been substantially unaffected by the compression of the sleeve on the outer surface of the needle.

Figure 5:
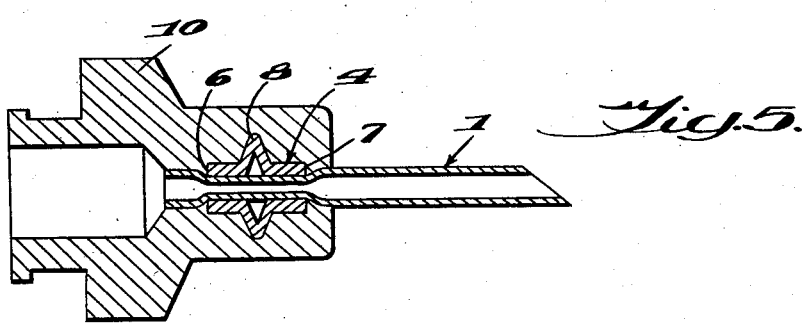
Fig. 5 is a partly sectioned view of the sleeve and cannula assemblage secured in the syringe head.

In Fig. 5, the needle and sleeve assemblage is shown in combination with the head 10 of the hypodermic syringe, not shown. The head 10 may be of a resilient material, such as rubber, or may be of a suitable synthetic plastic material molded about the sleeve and the needle. The radial projection 8 and the ends 6, 7 of the sleeve serve to rigidly hold the needle and sleeve assemblage in the head 10.

The means for securing the sleeve 4 to the needle 1 will now be described with particular reference to Figs. 6 and 7. As shown in Fig. 6 the needle is inserted into the bore of lower die member 11 and rests against the rubber stop block 12 in the lower portion thereof. The sleeve 4 is positioned in the bore of the upper die member 13 so that the upper end 6 thereof is seated against the shoulder 14 of the recess in the upper portion of the bore and the lower end 7 is positioned adjacent the upper end of the needle 1. Upon the downward stroke of the upper die member 13, the sleeve 4 is readily slipped upon the needle 1 until the lower sleeve end 7 is seated upon shoulder 15 of the recess of the upper end of the bore of the lower die member 11. Upon further movement of the upper die member 13 to complete the pressing stroke, the central portion of the sleeve 4 is expanded radially outwardly to form the projection 8. It should be mentioned that during the pinching operation on the sleeve, the vertical wall portions 16, 17 of the recesses in the die bores serve to maintain the tubular configuration of the ends of the sleeve as the central portion 8 is expanded against curved portions 18 and 19 of the die bore recesses. Upon completion of the pressure stroke, the upper die is lifted upwardly for removal of the needle and sleeve assemblage.

By variations in the length of the sleeve the diameter of the radial annular projection can be increased or diminished to a very wide degree. Also by variations in the die shape and pressure exerted, the depth in which the sleeve is impressed into the cannula can be accurately controlled.

Thus it is seen that according to the novel concepts of my invention, a hypodermic needle is inexpensively produced having a rigid radial projection intermediate its ends for use in firmly securing a hypodermic cannula to the syringe head.

Also according to the broad concepts of my invention, tubular sleeves may be rigidly secured concentrically about the circumference of various types of metal rods, wires and other hollow or solid cylindrical members.

While in accordance with the provisions of the statutes I have illustrated and described the best form of my invention known to me, it will be apparent to those skilled in the art that changes may be made in the form of the articles and method described without departing from the spirit of my invention as set forth in the appended claims.

I claim:

1. The method of securing a tubular sleeve upon a metal cylinder comprising the steps of placing the sleeve concentrically upon the cylinder intermediate its ends, and axially compressing the ends of said sleeve toward each other to form a radial annular projection at the central portion of said sleeve and a radial compression of said sleeve upon said cylinder.

2. The method of forming an annular radial projection on a hypodermic cannula intermediate its ends comprising the steps of placing a metal sleeve concentrically about the needle intermediate its ends, and axially compressing the ends of said sleeve toward each other to form a radially extending annular projection at the central portion of said sleeve and a radial compression of said sleeve upon the outer surface of said cylinder.

3. A hypodermic cannula comprising a hollow metal tube having an injection point at one end thereof and an annular recessed portion in the outer circumference thereof intermediate its ends, and a metal sleeve concentrically positioned about said tube in said recessed portion thereof, a portion of said sleeve intermediate its ends being formed into a radially extending annular projection.

4. A hypodermic cannula comprising a hollow metal tube having an injection point at one end thereof and an annular recessed portion in the outer circumference thereof intermediate its ends, said recessed portion having shoulders at each end thereof, and a metal sleeve concentrically positioned about said tube in said recessed portion thereof, the ends of said sleeve being contiguous with the shoulders of said recessed portion, a portion of said sleeve intermediate its ends being formed into a radially extending annular projection.

5. The method of securing a tubular sleeve upon a metal cylinder comprising the steps of placing the sleeve concentrically upon the cylinder intermediate its ends and radially compressing the sleeve upon said cylinder by reducing the sleeve diameter to such an extent and with sufficient force to form an annular groove in the outer circumference of said cylinder, thereby locking said sleeve into controlled and keyed position on said cylinder.

6. The method of securing tubular sleeves upon metal cylindrical objects such as wires or rods comprising the steps of placing the sleeve concentrically upon the cylinder intermediate its ends, and axially compressing the ends of said sleeve toward each other to form a radial annular projection at the central portion of said sleeve and a radial compression of said sleeve upon said cylindrical object.

References Cited in the file of this patent

UNITED STATES PATENTS 2,712,822      Gewecke _____ July 12, 1955